Patented Dec. 21, 1937

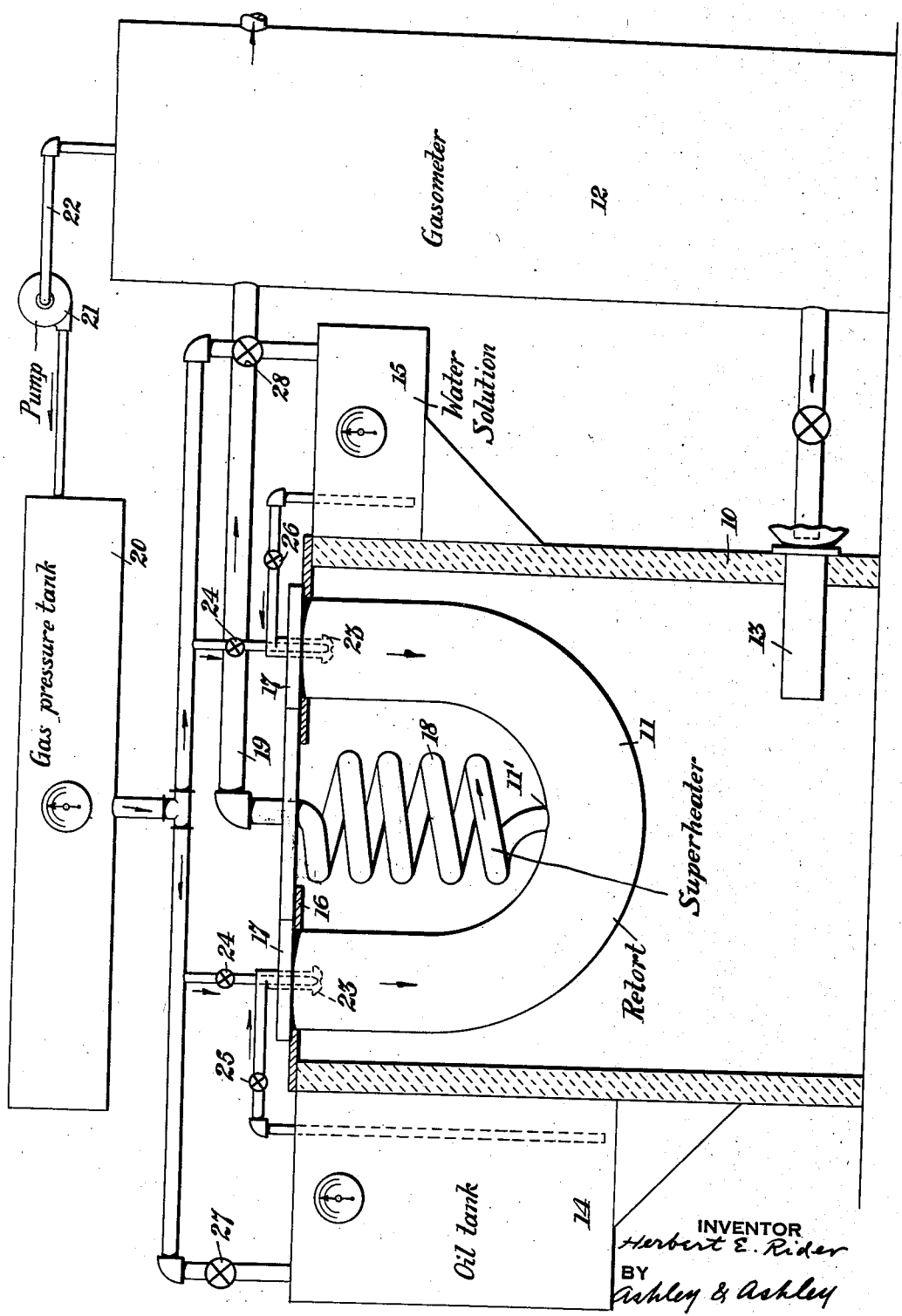

2,103,182

UNITED STATES PATENT OFFICE 2,103,182

PROCESS FOR MAKING GAS

Herbert E. Rider, New York, N. Y., assignor, by mesne assignments, to Henry L. Rosenfeld, Jr.

Application February 5, 1935, Serial No. 5,022

6 Claims. (Cl. 48—197)

My invention relates to processes for making gas from petroleum oils.

The object of my invention is to provide a process for treating oil by means of which a fixed gas of high heating value may be obtained at a low cost.

My process discloses newly discovered ingredients comprising a combination of chemicals which when added to water, is introduced into a heated retort simultaneously with the oil to convert the oil into a fixed gas.

The chemicals comprise a catalyst in solution.

I have found that in past processes of making gas from petroleum oils, that when water is somewhat dissociated at a high temperature and united with the broken down hydrocarbons of oils, that these gases from the somewhat dissociated water, created by a higher temperature than required to break down the hydrocarbons contained in the oils, result in a smaller yield of illuminants in the resultant fixed gas.

I have also found that only a percentage of the water used in other processes, is necessary, since it is used only as a carrier for the catalyst agent, already provided. Attention is directed to my copending Patent 2,085,510, issued June 29, 1937, which relates to the process and claims identical apparatus as herein described.

My process may be carried out by the use of a gas generating apparatus of simple construction such as shown and described herein, or by other suitable apparatus.

Referring to the drawing, the apparatus comprises a furnace 10 which may be heated by gas generated by the apparatus, or by other suitable heating means.

The gas for heating the retort 11 may be led from the gasometer 12 by a pipe leading to the burner 13.

14 indicates a tank for fuel oil and 15 a tank for holding water and chemicals in solution, the water serving as a vehicle for the other ingredients used in making the gas, including the catalyst hereinafter set forth.

The retort 11 is suspended from a cap-plate 16 which rests on the top of the furnace wall, as illustrated.

The retort comprises a cylindrical U-shaped tube which is provided with flanges 17—17 respectively at each upper end of the tube, and a helical tube 18 which extends from the upper side of the retort at 11' and discharges into pipe 19 leading to the gasometer 12, said tube serving as a superheater for the gas generated in the retort.

A tank 20 is provided for holding gas under suitable pressure, compressed by a pump 21 which draws gas from the gasometer thru pipe 22.

23—23 respectively indicate atomizers located in the opposite ends of the retort at the top thereof, to which gas is led from the tank 20 thru valves 24—24 respectively.

Valve 25 controls the oil supply from the tank 14 to its atomizer, and valve 26 controls the flow of the water and ingredients comprising a catalyst in a fluid condition, from tank 15 to its atomizer.

Valve 27 controls the flow of gas from tank 20 to the oil tank 14, and valve 28 controls the flow of gas from the same tank to the tank 15 containing the other ingredients.

The use of the gas generated by the apparatus to atomize the oil, and the other fluid also, dispenses with the use of steam or air, thus preventing air from entering the retort, except such as may be in a dissolved state in said fluid, thus adding to the heating quality of the gas while providing increased safety against explosion.

The operation of the apparatus is as follows:

The tank 20 may at first be charged with ordinary illuminating gas under proper pressure to atomize the oil and other fluids.

The retort is then heated to a temperature sufficient to gasify the fluids, the valves being closed.

The valves 24 are then opened and the valves 27 and 28 are opened to admit gas under pressure to the tanks 12 and 14, then valves 25 and 26 are opened and by properly adjusting them the oil and other fluids are forced into the retort in their proper relative proportions in an atomized condition and converted into gases which mix in the retort and are converted into a fuel gas, which may be further heated in the superheater to more perfectly combine the ingredients.

It will be noted that the temperature at which the gases are generated is not sufficiently high to convert the steam into its component elements.

I will now describe further important features of my invention.

*The materials used*

Low priced petroleum of any grade or consistency that is sufficiently mobile at ordinary temperatures, may be used directly, but heavy oils may be used by preheating them, the oils used being dependent on price etc.

In order to obtain a high thermal unit gas with a minimum of carbon deposition, it is necessary in this process to have a catalyst present.

The best way to use the catalyst is by introducing it into the retort with the water solution which insures a better distribution in the retort chamber.

The water in the solution converted into steam, tends to reduce the amount of carbon deposited in the retort, and causes such deposit as is formed to be light and flocculent, (not dense) and therefore easily removable.

In this process the steam is not reduced to its component elements but it is condensed and removed from the gas prior to further cooling of the gas and storing thereof.

The oil is preferably atomized as it is forced into the oil inlet side of the retort, but it could be heated to a gaseous condition and introduced in this form into the retort and then mixed with the gas formed from the other fluids, or vice versa.

The oil, and the water solution is heated in the retort to a temperature of 1150 to 1250 degrees F.

If the temperature is raised much above this point the resulting gas will not have as high heating value.

*Formula of the water solution*

Dissolve—

| | Grams |
|---|---|
| Potassium bichromate | 2 |
| Silver nitrate | 2 | in five gallons of water which has been acidulated by the addition of

| | Cubic centimeters |
|---|---|
| Concentrated sulphuric acid | 0.6 |
| Concentrated nitric acid | 0.6 |

After thoroughly mixing all together the solution is ready for use.

It will be understood that the above ingredients may be varied relative to each other within reasonable limits and still act to break down the hydrocarbon and provide a gas of high heating value.

I have found that the ingredients stated in the formula are sufficient in themselves to create a catalytic condition of the inner lining of the retort and superheater in which the gas is generated, to form a permanent catalyst for carrying out the gas-making reaction.

In practice, I prefer to carry out the process at a temperature approximately, 1207 degrees F. and to mix the oil and water solution in the proportions of three to six parts of oil to one of the water solution.

It may be found that a relatively less amount of water may be used, also that the amounts of silver nitrate and bichromate of potassium may be changed without impairing the successful operation of the process, and the product thereof.

Having thus described my invention, I claim as new:

1. The process of making a fixed gas from petroleum oil comprising the heating of oil to convert it into vapor in one part of a chamber, heating water and chemicals comprising a catalyst in solution in another part of the chamber to a reaction temperature of approximately 1207° F., mixing together the oil and solution while so heated at said temperature and thereafter separating the resultant fixed gas from the products of the reaction.

2. The process of making a fixed gas from petroleum oil comprising the heating of oil to convert it into vapor in one part of a chamber, simultaneously heating water and chemicals comprising a catalyst in solution in another part of the chamber to a reaction temperature of approximately 1207° F., mixing together the oil and solution while so heated at said temperature and thereafter separating the resultant fixed gas from the products of the reaction.

3. The process of making a fixed gas from petroleum oil comprising the atomizing of oil by fixed gas made therefrom into one part of a chamber, heating the atomized oil to convert it into vapor, atomizing by a portion of the fixed gas a mixture of water and chemicals comprising a catalyst in solution in another part of the chamber and heating the same to a reaction temperature of approximately 1207° F., mixing together the oil and solution while so heated at said temperature and thereafter separating the resultant fixed gas from the products of reaction.

4. The process of making a fixed gas from petroleum oil comprising heating the oil to convert it into a vapor, heating a solution of water and chemicals consisting of an acid, potassium bichromate and silver nitrate to a reaction temperature of approximately 1207° F., mixing together the oil and solution so heated while at said temperature and thereafter separating the resultant fixed gas from the products of the reaction.

5. The process of making a fixed gas from petroleum oil comprising heating the oil to convert it into a vapor, simultaneously heating a solution of water and chemicals consisting of an acid, potassium bichromate and silver nitrate to a reaction temperature of approximately 1207° F., mixing together the oil and solution so heated while at said temperature and thereafter separating the resultant fixed gas from the products of the reaction.

6. The process of making a fixed gas from petroleum oil comprising heating the oil to convert it into vapor, heating a solution consisting of potassium bichromate, silver nitrate, sulphuric and nitric acids and water to a reaction temperature of approximately 1207° F., mixing together the oil and solution so heated while at said temperature and thereafter separating the resultant fixed gas from the products of the reaction.

HERBERT E. RIDER.